US008909525B2

(12) United States Patent
Xiong et al.

(10) Patent No.: US 8,909,525 B2
(45) Date of Patent: Dec. 9, 2014

(54) INTERACTIVE VOICE RECOGNITION ELECTRONIC DEVICE AND METHOD

(75) Inventors: Yu-Kai Xiong, Shenzhen (CN); Xin Lu, Shenzhen (CN); Shih-Fang Wong, New Taipei (TW); Dong-Sheng Lv, Shenzhen (CN); Xin-Hua Li, Shenzhen (CN); Yu-Yong Zhang, Shenzhen (CN); Jian-Jian Zhu, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 689 days.

(21) Appl. No.: 13/205,627

(22) Filed: Aug. 9, 2011

(65) Prior Publication Data

US 2012/0265527 A1    Oct. 18, 2012

(30) Foreign Application Priority Data

Apr. 15, 2011    (CN) .......................... 2011 1 0095534

(51) Int. Cl.
*G10L 15/26*    (2006.01)
*G10L 15/08*    (2006.01)

(52) U.S. Cl.
CPC    *G10L 15/08* (2013.01); *G10L 15/26* (2013.01)
USPC ........................................................ 704/235

(58) Field of Classification Search
CPC ................................. G06F 17/30; G06F 15/26
USPC ................................................... 704/235, 270
See application file for complete search history.

(56) References Cited

U.S. PATENT DOCUMENTS

| 7,248,678 | B2 * | 7/2007 | Adams et al. ................. 379/126 |
| 8,515,764 | B2 * | 8/2013 | Nakano et al. ................ 704/275 |
| 2001/0039493 | A1 * | 11/2001 | Pustejovsky et al. ......... 704/235 |
| 2005/0143999 | A1 * | 6/2005 | Ichimura ....................... 704/251 |
| 2005/0177376 | A1 * | 8/2005 | Cooper et al. ................ 704/277 |
| 2008/0133245 | A1 * | 6/2008 | Proulx et al. ................. 704/277 |

* cited by examiner

*Primary Examiner* — Vincent P Harper
(74) *Attorney, Agent, or Firm* — Novak Druce Connolly Bove + Quigg LLP

(57) ABSTRACT

An interactive voice recognition electronic device converts a received voice signal to a text, and searches a voice databases to find a matched voice text of the converted text. The matched voice text is taken as a recognized voice text of the voice signal if the matched voice text exists in the voice database. The electronic device obtains a predetermined number of similar voice texts if no matched voice text exists in the voice database. The electronic device converts the predetermined number of similar voice texts to the voice signals, outputs the converted voice signals in turn, and selects one of the similar voice texts as the recognized voice text according to the selection of the user. The electronic device obtains the associated answer text of the recognized voice text in the voice database and converts the answer text to voice signals.

9 Claims, 2 Drawing Sheets

INTERACTIVE VOICE RECOGNITION ELECTRONIC DEVICE AND METHOD

BACKGROUND

1. Technical Field

The present disclosure relates to an interactive voice recognition electronic device and method.

2. Description of Related Art

Many electronic devices with voice recognition include a voice database. The voice database records answers to predetermined questions. When a voice of a user is received, the electronic device converts the voice to text information first, and then searches the similar question in the voice database according to the converted text information. After the similar question is found, the associated answer of the question is converted to voice signal to be output. However, due to different dialects and pronunciation of the users, the recognition of the voice may be wrong. Thus, results that the answer of the question cannot be found, and the electronic device can not interact with the user.

BRIEF DESCRIPTION OF THE DRAWINGS

The components of the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
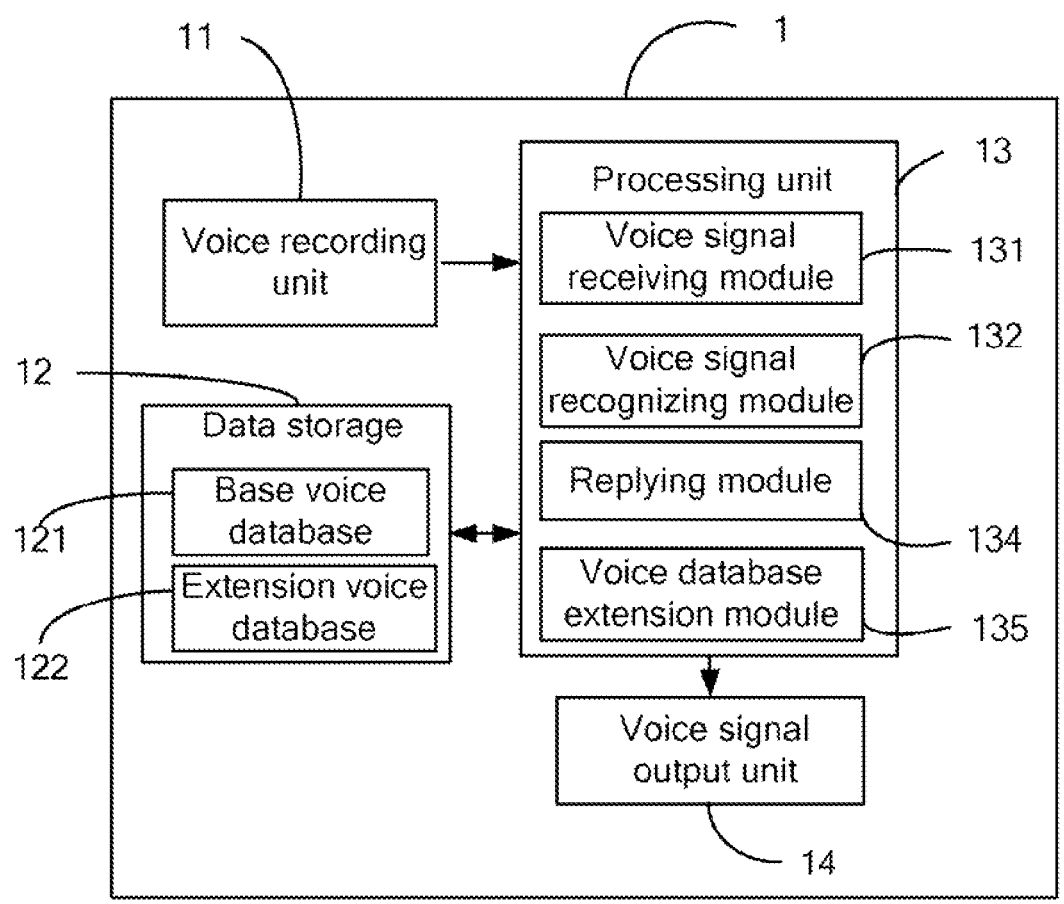
FIG. 1 is a block diagram of an interactive voice recognition electronic device in accordance with an exemplary embodiment.

FIG. 1 is a block diagram of an interactive voice recognition electronic device 1 (hereinafter "electronic device") in accordance with an exemplary embodiment. The electronic device 1 includes a voice recording unit 11, a data storage 12, a processing unit 13, and a voice signal output unit 14. The voice recording unit 11 records the voice signal of a user. The data storage 12 stores a base voice database 121 and an extension voice database 122. The base voice database 121 stores a number of predetermined voice texts and a number of answer texts each associated with one of the predetermined voice texts. The predetermined voice texts are texts converted from predetermined voice signals. The answer texts are texts converted from predetermined answer voice signals corresponding to the predetermined voice signals. The extension voice database 122 stores extension voice texts, which are texts converted from the voice signals input by the user and answer texts, which are answer texts corresponding to each extension of the voice texts. The voice signals input by the user are recorded by the voice recording unit 11 when the electronic device 1 interacts with the user. In the present embodiment, the voice recording unit 11 is a microphone, the voice signal output unit 14 is a speaker.

The processing unit 13 includes a voice signal receiving module 131, a voice signal recognition module 132, a replying module 133, and a voice database extension module 134. The voice signal receiving module 131 receives the voice signal recorded by the voice recording unit 11. The voice signal recognition module 132 converts the received voice signal to a text, and searches the base voice database 121 and the extension voice database 122 to find a matched voice text of the converted text. If the matched voice text exists in the base voice database 121 and the extension voice database 122, the voice signal is recognized by the electronic device 1 and the matched voice text is taken as a recognized voice text of the voice signal. If no matched voice text exists in the base voice database 121 and the extension voice data base 122, the voice signal recognition module 132 obtains a predetermined number of similar voice texts according to a best fit algorithm. After converting the predetermined number of similar voice texts to voice signals, the voice signal recognition module 132 outputs the converted voice signals in turn and sets one of the similar voice texts as the recognized voice text according to the selection of the user.

For example, because of poor pronunciation and different dialects of the user, the text of the voice signal input by user converted by the electronic device 1 may not correspond to the voice signal input by the user. For example, the voice signal input by user is "how can I get to Binghamton bus station from Albany bus station". However, the text, which the electronic device has converted, is "How can I get to Pinghamto bus station from Aldany bus station". If the converted text does not exist in base voice database 121 and the extension voice database 122, the voice recognized module 132 obtains a predetermined number of (such as 3) similar voice texts according to the best fit algorithm. The three similar voice texts are "How can I get to Binghamton bus station from Albany bus station", "How can I get to Binghamdo bus station from Albany bus station", and "How can I get to Binghamdo bus station from Aldamy bus station". After the three similar voice texts are acquired, the voice recognized module 132 converts the similar voice texts to voice signals and outputs the voice signals in turn through the voice signal output unit 14. When playing the voice signals, a predetermined voice signal, such as "please confirm your question 1 is . . . , question 2 is . . . , question 3 is . . . ," can be played as well. For example, "please confirm your question 1 is, How can I get to Binghamton bus station from Albany bus station, question 2 is, How can I get to Binghamdo bus station from Albany bus station, question 3 is, How can I get to Binghamdo bus station from Aldamy bus station." The user can select the voice text according to the played voice signals. Thus, the voice recognition module 132 determines the selected voice text is the recognized voice text according to the selection from the user.

After the recognized voice text is determined, the replying module 133 obtains the associated answer text of the recognized voice text in the base voice database 121 or the extension voice database 122, converts the answer text to the corresponding voice signal, and outputs the voice signal through the voice signal output unit 14 to the user.

After the answer text of the recognized voice text is determined, if the converted text does not exist in the base voice database 121 or the extension voice database 122, the voice database extension module 134 stores the converted text and the answer text of the recognized voice text to the extension voice database 122. For example, the voice database extension module 134 stores the converted text, "How can I get to Pinghamto bus station from Aldany bus station" and the associated answer text of the voice text, "How can I get to Pinghamto bus station from Aldany bus station" to the extension voice database 122.

If the similar voice texts exist neither in the base voice database 121 nor the extension voice database 122, the electronic device 1 outputs a predetermined voice signal, such as "Sorry, your question cannot be recognized, please repeated your question."

Figure 2:
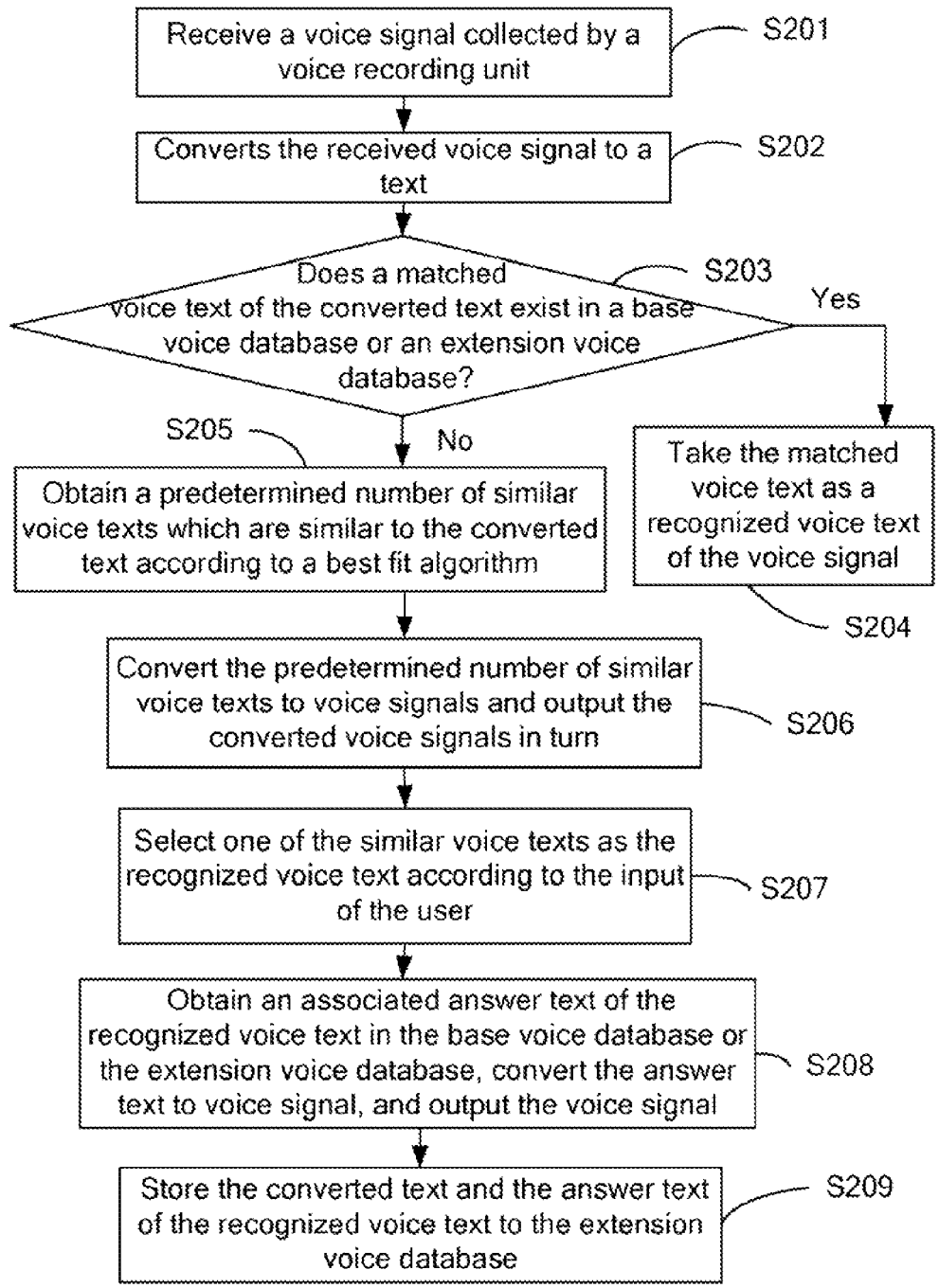
FIG. 2 is a flowchart of an interactive voice recognition method applied on the electronic device of FIG. 1, in accordance with an exemplary embodiment.

FIG. 2 is a flow chart of an interactive voice recognition method applied on the electronic device of FIG. 1. In step S201, the voice signal receiving module 131 receives the voice signal recorded by the voice recording unit 11.

In step S202, the voice signal recognition module 132 converts the received voice signal to a text.

In step S203, the voice signal recognition module 132 searches the base voice database 121 and the extension voice database 122 to determine whether a matched voice text of the converted text exists in the base voice database 121 or the extension voice database 122.

In step S204, the matched voice text is taken as a recognized voice text of the voice signal if the matched voice text exists in the base voice database 121 or the extension voice database 122.

In step S205, the voice signal recognition module 132 obtains a predetermined number of similar voice texts which are similar to the converted text according to a best fit algorithm if no matched voice text exists in the base voice database 121 and the extension voice data base 122.

In step S206, the voice signal recognition module 132 converts the predetermined number of similar voice texts to voice signals and outputs the converted voice signals in turn.

In step S207, the voice signal recognition module 132 selects one of the similar voice texts as the recognized voice text according to the selection of the user.

After the recognized voice text is determined, in step S208, the replying module 133 obtains the associated answer text of the recognized voice text in the base voice database 121 or the extension voice database 122, converts the answer text to voice signal, and outputs the voice signal through the voice signal output unit 14 to the user.

In step S209, the voice database extension module 134 stores the converted text and the answer text of the recognized voice text to the extension voice database 122.

Although, the present disclosure has been specifically described on the basis of preferred embodiments, the disclosure is not to be construed as being limited thereto. Various changes or modifications may be made to the embodiment without departing from the scope and spirit of the disclosure.

What is claimed is:

1. An interactive voice recognition electronic device comprising:

a voice recording unit for recording voice signals of user;

a data storage for storing at least one voice database, wherein the at least one voice database stores a plurality of voice texts and a plurality of answer texts each associated with one of the voice texts, the voice texts are texts converted from voice signals, the answer texts are texts converted from answer voice signals corresponding to the voice signals;

a voice signal output unit; and a processing unit comprising:

a voice signal receiving module for receiving a voice signal collected by the voice recording unit;

a voice signal recognition module for converting the received voice signal to a text, searching the at least one voice database to find a matched voice text of the converted text, the matched voice text being taken as a recognized voice text of the voice signal if the matched voice text exists in the at least one voice database; and for obtaining a predetermined number of similar voice texts which are similar to the converted text according to a best fit algorithm if no matched voice text exists in the at least one voice database, converting a predetermined number of the similar voice texts to the voice signals, outputting the converted voice signals in turn, and selecting one of the similar voice texts as the recognized voice text according to the selection of the user; and a replying module for obtaining the associated answer text of the recognized voice text in the at least one voice database and converting the answer text to the voice signal, and outputting the voice signal through the voice signal output unit to the user.

2. The interactive voice recognition electronic device as described in claim 1, wherein the at least one voice database comprises a base voice database and a extension voice database, the base voice database stores a plurality of predetermined voice texts and plurality of answer texts each associated with one of the predetermined voice texts, the predetermined voice texts are texts converted from predetermined voice signals, the answer texts are texts converted from predetermined answer voice signals corresponding to the predetermined voice signals, the extension voice database stores a plurality of extension voice texts which are texts converted from the voice signals input by the user and a plurality of answer texts which are answer texts corresponding to one of the extension voice texts.

3. The interactive voice recognition electronic device as described in claim 2, wherein the processing unit further comprises a voice database extension module, after the answer text of the recognized voice text is determined, the voice database extension module stores the converted text and the answer text of the recognized voice text to the extension voice database if the converted text does not exist in the base voice database or the extension voice database.

4. The interactive voice recognition electronic device as described in claim 2, wherein the electronic device outputs a predetermined voice signal if the similar voice texts exist neither in the base voice database nor the extension voice database.

5. The interactive voice recognition electronic device as described in claim 2, wherein the voice recording unit is a microphone, the voice signal output unit is a speaker.

6. An interactive voice recognition method applied to an electronic device, the electronic device storing at least one voice database, wherein the at least one voice database stores a plurality of voice texts and a plurality of answer texts each associated with one of the voice texts, the voice texts are texts converted from voice signals, the answer texts are texts converted from answer voice signals corresponding to the voice signals, the method comprising:

receiving a voice signal collected by a voice recording unit;

converting the received voice signal to a text;

searching the at least one voice database to find a matched voice text of the converted text, the matched voice text being taken as a recognized voice text of the voice signal if the matched voice text exists in the at least one voice database;

obtaining a predetermined number of the similar voice texts which are similar to the converted text according to a best fit algorithm if no matched voice text exists in the at least one voice database;

converting the predetermined number of similar voice texts to the voice signals;

outputting the converted voice signals in turn;

selecting one of the similar voice texts as the recognized voice text according to the selection of the user; and obtaining the associated answer text of the recognized voice text in the at least one voice database and converting the answer text to the voice signal, and outputting the voice signal through a voice signal output unit to the user.

7. The method as described in claim 6, wherein the at least one voice database comprises a base voice database and a extension voice database, the base voice database stores a plurality of predetermined voice texts and a plurality of answer texts each associated with one of the predetermined voice texts, the predetermined voice texts are texts converted from predetermined voice signals, the answer texts are texts converted from predetermined answer voice signals corresponding to the predetermined voice signals, the extension voice database stores a plurality of extension voice texts which are texts converted from the voice signals input by the user and a plurality of answer texts which are answer texts corresponding to one of the extension voice texts.

8. The method as described in claim 7, further comprising storing the converted text and the answer text of the recognized voice text to the extension voice database if the converted text does not exist in the base voice database or the extension voice database, after the answer text of the recognized voice text is determined.

9. The method as described in claim 7, further comprising outputting a predetermined voice signal if the similar voice texts exist neither in the base voice database and the extension voice database.

\* \* \* \* \*